US012545573B2

(12) United States Patent
Singh et al.

(10) Patent No.: US 12,545,573 B2
(45) Date of Patent: Feb. 10, 2026

(54) METHODS AND SYSTEMS FOR SECURE, METERED BEVERAGE DISPENSING

(71) Applicant: DT Whisky Solutions, Inc., Fort Worth, TX (US)

(72) Inventors: Amrit Singh, Uttar Pradesh (IN); Nirmal Chudgar, Gujarat (IN); Shawn B. Smith, Fort Worth, TX (US); Nagendra Palle, Danville, CA (US)

(73) Assignee: DT Whisky Solutions, Inc., Fort Worth, TX (US)

( * ) Notice: Subject to any disclaimer, the term of this patent is extended or adjusted under 35 U.S.C. 154(b) by 230 days.

(21) Appl. No.: 17/974,365

(22) Filed: Oct. 26, 2022

(65) Prior Publication Data

US 2023/0126019 A1    Apr. 27, 2023

Related U.S. Application Data

(60) Provisional application No. 63/272,341, filed on Oct. 27, 2021.

(51) Int. Cl.
*B67D 1/12* (2006.01)
*B67D 1/08* (2006.01)
*G06Q 20/32* (2012.01)

(52) U.S. Cl.
CPC ......... *B67D 1/1243* (2013.01); *B67D 1/0888* (2013.01); *B67D 1/1277* (2013.01); *G06Q 20/3278* (2013.01)

(58) Field of Classification Search
CPC .. B67D 1/1243; B67D 1/0888; B67D 1/1277; G06Q 20/3278

(Continued)

(56) References Cited

U.S. PATENT DOCUMENTS 5,603,430 A  *  2/1997  Loehrke ............... B67D 1/1234
                                                        222/37
5,731,981 A  *  3/1998  Simard ................. G01F 13/006
                                                        235/94 R (Continued)

FOREIGN PATENT DOCUMENTS

WO    WO-2021257986 A1  * 12/2021    ........... B67D 1/0888
WO    WO-2023076423 A1  *  5/2023    ........... B67D 1/0888

*Primary Examiner* — Paul R Durand
*Assistant Examiner* — Michael J. Melaragno
(74) *Attorney, Agent, or Firm* — Spano Law Group; Joseph S. Spano

(57) ABSTRACT

Methods and systems for accurately and securely dispensing high value beverages are presented herein. A beverage distribution system includes one or more replaceable beverage cartridges mounted to a beverage dispensing device. Each of the beverage cartridges includes a fluid reservoir with an output port, an output control valve, a flowmeter, and a local controller. The local controller receives signals from the flow meter and determines a cumulative amount of beverage fluid dispensed from the beverage cartridge based on the received signals. In one embodiment, the beverage dispensing device includes a fluid pump and a master controller. The master controller also estimates the cumulative amount of beverage fluid dispensed from each beverage cartridge based on control commands communicated to each beverage cartridge. If a difference between the estimated cumulative amounts of fluid dispensed from a beverage cartridge exceeds a predetermined threshold value, an alert is generated.

19 Claims, 6 Drawing Sheets

(58) Field of Classification Search
USPC .......................................................... 222/59
See application file for complete search history.

(56) References Cited

U.S. PATENT DOCUMENTS

| | | | | |
|---|---|---|---|---|
| 8,857,666 B2* | 10/2014 | O'Keefe, Jr. | ........ | B67D 1/0885 |
| | | | | 222/37 |
| 10,889,787 B2* | 1/2021 | Fearnside | ................ | C12G 3/07 |
| 11,954,554 B1* | 4/2024 | Singh | ................ | G06K 7/10366 |
| 2006/0113369 A1* | 6/2006 | Taylor | ................ | G06K 7/10336 |
| | | | | 235/375 |
| 2008/0029541 A1* | 2/2008 | Wallace | ................ | B67D 1/0079 |
| | | | | 222/207 |
| 2011/0298583 A1* | 12/2011 | Libby | ................ | B67D 1/0888 |
| | | | | 340/5.2 |
| 2015/0253174 A1* | 9/2015 | Barrett | ................ | G01F 23/0007 |
| | | | | 73/304 C |
| 2015/0336784 A1* | 11/2015 | Moezidis | ................ | B01F 33/846 |
| | | | | 222/1 |
| 2016/0090288 A1* | 3/2016 | Givens, Jr. | ............ | G07F 13/065 |
| | | | | 700/283 |
| 2016/0355389 A1* | 12/2016 | Bursey | ................ | B67D 1/0004 |
| 2017/0190558 A1* | 7/2017 | Ubidia | ................ | G05D 7/0682 |
| 2019/0300357 A1* | 10/2019 | Crawford | ............ | G07F 13/065 |
| 2021/0188612 A1* | 6/2021 | Radcliffe | ................ | B67D 1/0051 |
| 2022/0144619 A1* | 5/2022 | Otto | ........................ | B67D 1/07 |
| 2022/0388829 A1* | 12/2022 | Beavis | ...................... | G01F 3/20 |
| 2023/0069727 A1* | 3/2023 | Comunale | ............ | B67D 1/0004 |
| 2023/0126019 A1* | 4/2023 | Singh | .................... | G07F 13/065 |
| | | | | 222/59 |
| 2023/0138611 A1* | 5/2023 | Kudirka | ............... | B67D 1/0888 |
| | | | | 222/52 |
| 2023/0383734 A1* | 11/2023 | Beavis | ................ | F04B 17/044 |
| 2024/0101407 A1* | 3/2024 | Kudirka | ............... | B67D 1/0834 |

* cited by examiner

METHODS AND SYSTEMS FOR SECURE, METERED BEVERAGE DISPENSING

CROSS REFERENCE TO RELATED APPLICATIONS

The present application for patent claims priority under 35 U.S.C. § 119 from U.S. provisional patent application Ser. No. 63/272,341, entitled "Methods And Systems For Secure, Metered Beverage Dispensing," filed Oct. 27, 2021, the entire subject matter of which is incorporated herein by reference.

TECHNICAL FIELD

The described embodiments relate to automated and secure beverage dispensing systems.

BACKGROUND INFORMATION

Traditionally high value beverages, e.g., high value wine and liquors, are manually prepared to order by a human, e.g., a bartender. However, lack of security and oversight, lack of availability of suitably trained labor, or both, may limit the profitability of high value beverages in many retail environments. As a result, the availability of high value beverages may become increasingly limited in the future.

Improvements in the security and monitoring of high value beverages from the manufacturing site to the dispensing location are desired.

SUMMARY

Methods and systems for accurately and securely dispensing high value beverages are presented herein.

In one aspect, a beverage distribution system includes one or more replaceable beverage cartridges mounted to a beverage dispensing device. Each of the beverage cartridges includes a fluid reservoir with an output port, an output control valve, a flowmeter, and a local controller. The local controller receives signals from the flow meter and determines a cumulative amount of beverage fluid dispensed from the beverage cartridge based on the received signals. If the cumulative amount exceeds a predetermined threshold value, the local controller commands the output valve to close.

The beverage dispensing device includes a fluid pump and a master controller. The master controller is communicatively coupled to the local controller of each beverage cartridge mounted to the beverage dispensing device. In addition, an input port of the fluid pump is coupled to the output port of each beverage cartridge mounted to the beverage dispensing device. The master controller controls the amount of beverage fluid dispensed from the output port of the fluid pump by controlling the fluid pump. In addition, the master controller estimates the cumulative amount of beverage fluid dispensed from each of the one or more beverage cartridges based on the control commands to the fluid pump.

In a further aspect, the master controller determines a difference between the cumulative amounts of fluid dispensed from each of the one or more beverage cartridges as determined by the master controller and the local controller of a particular beverage cartridge. If the difference exceeds a predetermined threshold value, an alert is generated by the master controller.

In another further aspect, a beverage distribution system includes a beverage tracking server system communicatively coupled to the beverage dispensing device. The beverage dispensing device is configured to communicate messages to the beverage tracking server system, including, but not limited to, a number of pours from a particular beverage cartridge, an identification of a user of the beverage dispensing device, discrepencies between cumulative amounts of beverage fluid dispensed from a particular beverage cartridge as estimated by the master and local controllers, etc.

In another further aspect, an amount of memory of a local controller is non-volatile memory storing the known initial fill amount, the estimated cumulative amount of fluid dispensed, the identification code associated with the beverage cartridge, etc. In this manner, the estimated cumulative amount of fluid dispensed from a cartridge can be read from the cartridge independent of any beverage dispensing device employed to dispense fluid from the cartridge. For example, a cartridge may be moved from one beverage dispensing device to another and the estimated cumulative amount of fluid dispensed from the cartridge may be communicated from the local controller of the cartridge to the master controller of each beverage dispensing device when the cartridge is installed in the beverage dispensing device.

In another further aspect, a local controller sends a control signal to an output valve commanding the output valve to remain in a closed state when the cumulative amount of beverage fluid dispensed as estimated by the local controller exceeds the known initial fill stored in memory.

In a another further aspect, a master controller determines a difference between the cumulative amount of fluid dispensed from a cartridge as estimated by the master controller and the cumulative amount of fluid estimated from the cartridge as estimated by the local controller of the cartridge. If the difference exceeds a predetermined threshold value (e.g., more than 10% of the amount dispensed), an indication of a discrepancy (e.g., an alert message) is communicated from the master controller to beverage tracking server.

In a further aspect, a local controller communicates a command signal to the output valve in response to a command signal from the master controller only if the command signal from the master controller includes a predetermined code stored on a memory of the local controller. In this manner, fluid is only dispensed from a particular cartridge if a security code associated with the cartridge is known to the master controller.

In another further aspect, a beverage dispensing device includes a short range wireless communication device electrically coupled to the master controller. The short range wireless communication device is configured to identify a user of the beverage distribution system, collect payment, etc.

In another further aspect, a beverage dispensing device includes a graphical user interface (GUI) device electrically coupled to the master controller. The user of the beverage dispensing device interacts with the GUI device to identify a beverage order, collect payment, etc.

In another further aspect, a master controller tracks the users of a beverage dispensing device and their beverage orders, and communicates the tracking data to beverage tracking server.

The foregoing is a summary and thus contains, by necessity, simplifications, generalizations, and omissions of detail; consequently, those skilled in the art will appreciate that the summary is illustrative only and is not limiting in any way. Other aspects, inventive features, and advantages of the devices and/or processes described herein will become apparent in the non-limiting detailed description set forth herein.

DETAILED DESCRIPTION

Reference will now be made in detail to background examples and some embodiments of the invention, examples of which are illustrated in the accompanying drawings.

Methods and systems for accurately and securely dispensing high value beverages are presented herein.

In one aspect, a beverage distribution system includes one or more replaceable beverage cartridges mounted to a beverage dispensing device. Each of the beverage cartridges includes a fluid reservoir with an output port, an output control valve, a flowmeter, and a local controller. The local controller receives signals from the flow meter and determines a cumulative amount of beverage fluid dispensed from the beverage cartridge based on the received signals. If the cumulative amount exceeds a predetermined threshold value, the local controller commands the output valve to close.

The beverage dispensing device includes a fluid pump and a master controller. The master controller is communicatively coupled to the local controller of each beverage cartridge mounted to the beverage dispensing device. In addition, an input port of the fluid pump is coupled to the output port of each beverage cartridge mounted to the beverage dispensing device, such that fluid dispensed from any of the attached beverage cartridges is plumbed to the input port of the fluid pump. In this manner, the fluid pump is fluidically coupled to each of the beverage cartridges mounted to the beverage dispensing device. The master controller controls the amount of beverage fluid dispensed from the output port of the fluid pump by controlling the fluid pump. In addition, the master controller estimates the cumulative amount of beverage fluid dispensed from each of the one or more beverage cartridges based on the control commands to the fluid pump.

In a further aspect, the master controller determines a difference between the cumulative amounts of fluid dispensed from each of the one or more beverage cartridges as determined by the master controller and the local controller of a particular beverage cartridge. If the difference exceeds a predetermined threshold value, an alert is generated by the master controller.

In another further aspect, a beverage distribution system includes a beverage tracking server system communicatively coupled to the beverage dispensing device. The beverage dispensing device is configured to communicate messages to the beverage tracking server system. These messages include a number of pours from a particular beverage cartridge, an identification of a user of the beverage dispensing device, discrepancies between cumulative amounts of beverage fluid dispensed from a particular beverage cartridge as estimated by the master and local controllers, etc.

Figure 1:
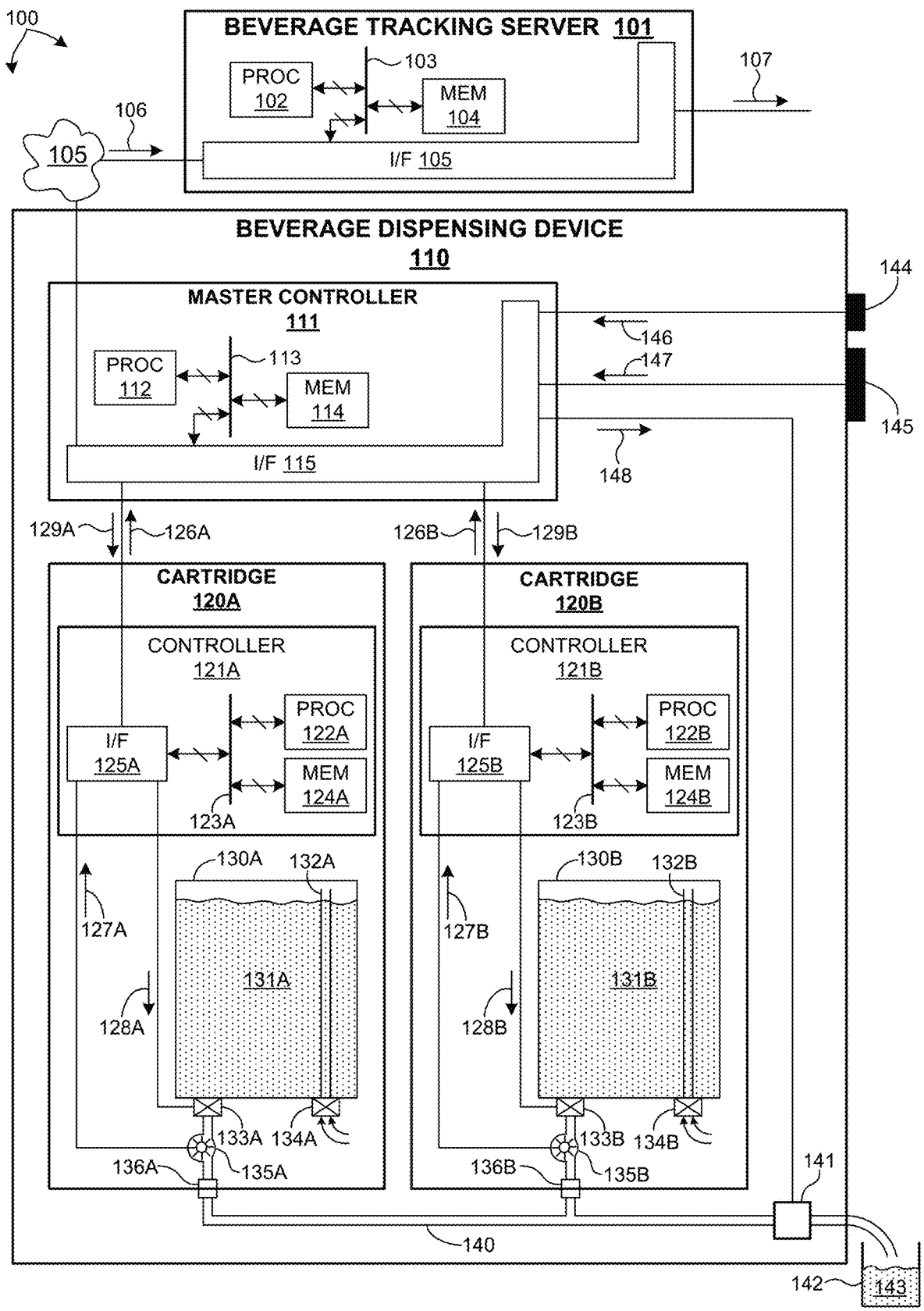
FIG. 1 is a simplified diagram illustrative of a beverage distribution system 100 in one embodiment.

FIG. 1 is a diagram illustrative of a beverage distribution system 100 in one embodiment. As depicted in FIG. 1, beverage distribution system 100 includes a beverage tracking server 101 communicatively linked to beverage dispensing device 110. In some embodiments, the beverage tracking server 101 is communicatively linked to the beverage dispensing device 110 via the Internet 105. However, in general, a beverage tracking server 101 may be communicatively linked to a beverage dispensing device 110 by any communication link known to those skilled in the art. For example, beverage tracking server 101 may be communicatively linked to beverage dispensing device 110 over a local area network (LAN), a wireless communications network, or any other suitable communications network.

Although FIG. 1 depicts beverage tracking server 101 communicatively linked to one beverage dispensing device, in general, a beverage tracking server 101 is communicatively coupled to one or more beverage dispensing devices in one or more geographic locations. In this manner, a beverage tracking server 101 is able to monitor beverage distribution from beverage dispensing devices located over a large geographic region (e.g., nationwide distribution, global distribution, etc.).

As depicted in FIG. 1, beverage dispensing device 110 includes a master controller 111 and two attached beverage cartridges 120A-B. Although, as depicted in FIG. 1, beverage dispensing device 110 includes two attached beverage cartridges, in general, a beverage dispensing device may include any suitable number of attached beverage cartridges.

Master controller 111 includes a processor 112 and memory 114. Processor 112 and memory 114 communicate over bus 113. Memory 114 includes an amount of memory that stores beverage dispense information. Memory 114 also includes an amount of memory that stores program code that, when executed by processor 112, causes processor 112 to implement beverage dispensing monitoring and control functionality as described herein.

Beverage cartridges 120A-B each include a local controller 121A-B, respectively. Local controller 121A includes a processor 122A and memory 124A. Processor 122A and memory 124A communicate over bus 123A. Memory 124A includes an amount of memory that stores beverage dispense information. Memory 124A also includes an amount of memory that stores program code that, when executed by processor 122A, causes processor 122A to implement beverage dispensing monitoring and control functionality as described herein. Similarly, local controller 121B includes a processor 122B and memory 124B. Processor 122B and memory 124B communicate over bus 123B. Memory 124B includes an amount of memory that stores beverage dispense information. Memory 124B also includes an amount of memory that stores program code that, when executed by processor 122B, causes processor 122B to implement beverage dispensing monitoring and control functionality as described herein.

Each local controller 121A-B is communicatively coupled to master controller 111 via a wired or wireless communications interface 125A-B, respectively. In some embodiments, each local controller 121A-B is communicatively linked to master controller 111 by a universal serial bus (USB) interface. In some embodiments a dedicated, encrypted wired communication link (e.g., a wired communication link adhering to the RS-485 standard) is employed to communicatively link each local controller 121A-B and master controller 111. In some embodiments a dedicated wireless communication bridge (e.g., a wireless communication link adhering to the IEEE 802.11 protocol) is employed to communicatively link each local controller 121A-B and master controller 111. In one of these embodiments, each local controller 121A-B and master controller 111 includes a USB-wireless fidelity (WiFi) communication device (interface 125A-B and interface 115, respectively) that establishes a WiFi communication link between each local controller 121A-B and master controller 111. In some embodiments, master controller 111 serves as the WiFi host and each local controller acts as the WiFi client. The WiFi host is configured to only allow a connection from the specific local controller within the housing of the beverage dispensing device 110 through MAC address permissions. In these embodiments, information is communicated between master controller 111 and local controllers 121A-B over the WiFi connection in accordance with the TCP/IP protocol. In some embodiments, information communicated between master controller 111 and local controllers 121A-B is encrypted. In these embodiments, communication interfaces 115 and 125A-B include encryption and decryption facilities to enable secure communication.

As depicted in FIG. 1, cartridge 120A includes a reservoir 130A containing beverage fluid 131A. Reservoir 130A includes an output port through which beverage fluid 131A exits reservoir 130A. The output port is coupled to manifold 140 via detachable coupler 136A. An output valve 133A and flowmeter 135A are located at the output port between reservoir 130A and detachable coupler 136A. Reservoir 130A also includes an inlet port through which air enters reservoir 130A. A one-way valve 134A controls airflow through vent tube 132A into reservoir 130A. As beverage fluid 131A exits reservoir 130A, a low pressure is generated in the airspace of reservoir 130A. The pressure difference between the relatively low pressure in the airspace of reservoir 130A and the relatively high pressure of the ambient environment causes one-way valve 134A to open, allowing air to flow from the ambient environment through vent tube 132A into the airspace of reservoir 130A. In this manner, the air pressure within reservoir 130A is maintained near ambient pressure as beverage fluid 131A is drained from reservoir 130A. Output valve 133A controls the flow of beverage fluid 131A from reservoir 130A. Output valve 133A operates in one of two states based on the state of a command signal 128A communicated to output valve 133A from controller 121A. In a closed state, output valve does not allow fluid to pass through the valve. In an open state, output valve allows fluid to pass. Flowmeter 135A measures the flow of fluid from the output port of reservoir 130A. Signals 127A indicative of the flow rate are communicated to controller 121A. In some embodiments, controller 121A determines whether the flow through flowmeter 135A includes a combination of liquid and air flow based on the signals 127A. If the flow includes some amount of air, controller 121A communicates a message to master controller 111 indicating that the flow through flowmeter 135A is entrained with air and that the flow should be stopped. In this manner, local controller 121A ensures that no false dispense events occur.

Similarly, cartridge 120B includes a reservoir 130B containing beverage fluid 131B. Reservoir 130B includes an output port through which beverage fluid 131B exits reservoir 130B. The output port is coupled to manifold 140 via detachable coupler 136B. An output valve 133B and flowmeter 135B are located at the output port between reservoir 130B and detachable coupler 136B. Reservoir 130B also includes an inlet port through which air enters reservoir 130B. A one-way valve 134B controls airflow through vent tube 132B into reservoir 130B. As beverage fluid 131B exits reservoir 130B, a low pressure is generated in the airspace of reservoir 130B. The pressure difference between the relatively low pressure in the airspace of reservoir 130B and the relatively high pressure of the ambient environment causes one-way valve 134B to open, allowing air to flow from the ambient environment through vent tube 132B into the airspace of reservoir 130B. In this manner, the air pressure within reservoir 130B is maintained near ambient pressure as beverage fluid 131B is drained from reservoir 130B. Output valve 133B controls the flow of beverage fluid 131B from reservoir 130B. Output valve 133B operates in one of two states based on the state of a command signal 128B communicated to output valve 133B from controller 121B. In a closed state, output valve does not allow fluid to pass through the valve. In an open state, output valve allows fluid to pass. Flowmeter 135B measures the flow of fluid from the output port of reservoir 130B. Signals 127B indicative of the flow rate are communicated to controller 121B. In some embodiments, controller 121B determines whether the flow through flowmeter 135B includes a combination of liquid and air flow based on the signals 127B. If the flow includes some amount of air, controller 121B communicates a message to master controller 111 indicating that the flow through flowmeter 135B is entrained with air and that the flow should be stopped. In this manner, local controller 121B ensures that no false dispense events occur.

As depicted in FIG. 1, manifold 140 is coupled to the input port of fluid pump 141. In this manner, the output ports of reservoirs 130A-B, respectively, are plumbed to the input of fluid pump 141. As depicted in FIG. 1, master controller 111 is communicatively coupled to fluid pump 141 and the local controller of each of the one or more beverage cartridges. Master controller 111 communicates a command signal 148 to fluid pump 141 indicative of an amount of fluid to be dispensed by fluid pump 141. In response to command signal 148, fluid pump dispenses the desired amount of fluid. In addition, in one example, master controller 111 communicates a command signal 129A to local controller 121A that causes the local controller to communicate command signal 128A to output valve 133A that causes output valve 133A to remain in an open state during the time fluid pump 141 dispenses the desired amount of fluid. Similarly, master controller 111 communicates a command signal 129B to local controller 121B that causes the local controller to communicate command signal 128B to output valve 133B that causes output valve 133B to remain in a closed state during the time fluid pump 141 dispenses the desired amount of fluid. In this manner, master controller 111 selects the cartridge from which a particular pour is to be dispensed. In addition, local controller 121A communicates a signal 126A to master controller 111 that identifies the liquid 131A present in reservoir 130A. Similarly, local controller 121B communicates a signal 126B to master controller 111 that identifies the liquid 131B present in reservoir 130B.

In one embodiment, fluid pump 141 is a displacement pump driven by a stepper motor, e.g., pump model number 304K/BT manufactured by JIH Pump (China). In this embodiment, command signal 148 indicates the number of pulses of the stepper drive motor required to dispense the desired amount of fluid. The output port of fluid pump 141 is coupled to a spout that dispenses the desired amount of liquid 143 into a receptacle (e.g., glass) for consumption by the customer.

In the embodiment depicted in FIG. 1, the pressure in the airspace of reservoirs 130A and 130B is maintained at the air pressure of the ambient environment. However, in some other embodiments, the airspace of reservoirs 130A and 130B are maintained at a controlled air pressure to achieve a relatively high flowrate out of each reservoir, thus decreasing the amount of time necessary to dispense the desired amount of fluid. In addition, by precisely controlling the air pressure in the airspace of reservoirs 130A and 130B, the flowrate from each reservoir is more consistent over time. Also, by employing controlled air pressure to drive liquid flow from each reservoir, the fluid pump 141 can be eliminated as depicted in FIG. 9.

Figure 9:
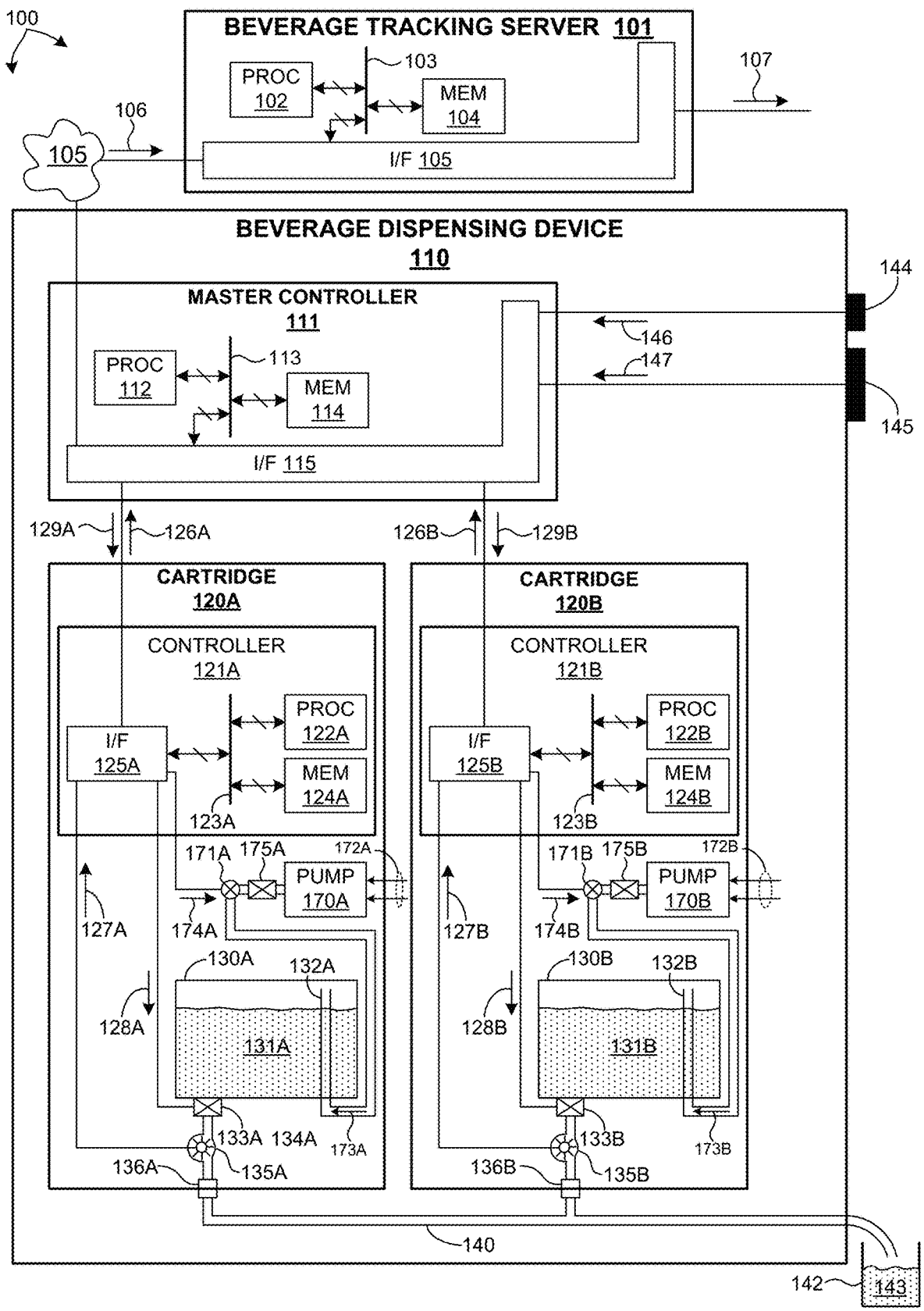
FIG. 9 is a simplified diagram illustrative of a beverage distribution system 100 in another embodiment.

As depicted in FIG. 9, cartridge 120A includes an air pump 170A that pressurizes a flow of air 172A. Pressurized air passes through one-way valve 175A and pressure control valve 171A. Master controller 111 communicates a command signal 129A to local controller 121A that causes the local controller to communicate command signal 174A to pressure control valve 171A that causes valve 171A to precisely control the pressure of the airflow 173A through vent tube 132A into reservoir 130A. As beverage fluid 131A exits reservoir 130A, the pressure in the airspace of reservoir 130A is precisely maintained by pressure control valve 171A.

Similarly, cartridge 120B includes an air pump 170B that pressurizes a flow of air 172B. Pressurized air passes through one-way valve 175B and pressure control valve 171B. Master controller 111 communicates a command signal 129B to local controller 121B that causes the local controller to communicate command signal 174B to pressure control valve 171B that causes valve 171B to precisely control the pressure of the airflow 173B through vent tube 132B into reservoir 130B. As beverage fluid 131B exits reservoir 130B, the pressure in the airspace of reservoir 130B is precisely maintained by pressure control valve 171B.

In a further aspect, master controller 111 determines a cumulative amount of beverage fluid dispensed from each attached beverage cartridge based on the known commanded amounts of fluid dispensed by fluid pump 141 from each beverage cartridge.

In another further aspect, each local controller estimates a cumulative amount of beverage fluid dispensed from a beverage cartridge based on the signals generated by the flowmeter of the beverage cartridge.

For example, as illustrated in FIG. 1, the flow of beverage fluid 131A dispensed from cartridge 120A is measured by flow meter 133A, e.g., Model FM-HL3012B flowmeter manufactured by EPT Technology Co., LTD. (China). Signals 127A communicated from flowmeter 135A to controller 121A indicate the flow over time. From these signals, local controller 120A calculates the amount of fluid dispensed from reservoir 130A for each pour, and the cumulative amount of fluid dispensed from reservoir 130A from the time of initial fill in a factory environment. The initial amount of beverage fluid within the fluid reservoir 130A is loaded onto memory 124A at the factory.

In another further aspect, the local controller sends a control signal to the output valve commanding the output valve to remain in a closed state when the cumulative amount of beverage fluid dispensed as estimated by the local controller exceeds the known initial fill stored in memory.

In another further aspect, an amount of memory of a local controller is non-volatile memory storing the known initial fill amount, the estimated cumulative amount of fluid dispensed, the identification code associated with the beverage cartridge, etc. In this manner, the estimated cumulative amount of fluid dispensed from a cartridge can be read from the cartridge independent of any beverage dispensing device employed to dispense fluid from the cartridge. For example, a cartridge may be moved from one beverage dispensing device to another and the estimated cumulative amount of fluid dispensed from the cartridge may be communicated from the local controller of the cartridge to the master controller of each beverage dispensing device when the cartridge is installed in the beverage dispensing device.

In a another further aspect, a master controller determines a difference between the cumulative amount of fluid dispensed from a cartridge as estimated by the master controller and the cumulative amount of fluid estimated from the cartridge as estimated by the local controller of the cartridge. If the difference exceeds a predetermined threshold value (e.g., more than 10% of the amount dispensed), an indication of a discrepancy 106 (e.g., an alert message) is communicated from the master controller 111 to beverage tracking server 101.

In a further aspect, the local controller communicates the command signal to the output valve in response to the command signal from the master controller only if the command signal from the master controller includes a predetermined code stored on a memory of the local controller. In this manner, fluid is only dispensed from a particular cartridge if a security code associated with the cartridge is known to the master controller.

In another further aspect, a beverage dispensing device includes a short range wireless communication device (e.g., a Radio Frequency Identification (RFID) device, a Near Field Communication (NFC) device, etc.) electrically coupled to the master controller. The short range wireless communication device is configured to identify a user of the beverage distribution system, collect payment, etc. As depicted in FIG. 1, RFID reader 144 is mounted to beverage dispensing device 110 in a location that is accessible from the external environment. In one example, a user of beverage dispensing device 110 waves an identification card near the surface of RFID reader 144. In response, RFID reader 144 detects the identification number encoded in the identification card and communicates a signal 146 indicative of the identification number to master controller 111. In one example, master controller 111 authenticates the user by comparing the detected identification number with a list of authorized identification numbers programmed onto memory 114 of master controller 111. In another example, master controller 111 authenticates the user by communicating the detected identification number to beverage tracking server 101, and server 101 responds with a signal indicating whether the detected identification number is authorized or not. If the identification number is authorized, the user may continue to interact with the beverage dispensing device to dispense and pay for drinks.

In another further aspect, a beverage dispensing device 110 includes a graphical user interface (GUI) device electrically coupled to the master controller. As depicted in FIG. 1, GUI device 145 is mounted to beverage dispensing device 110 in a location that is accessible from the external environment. The user of the beverage dispensing device 110 interacts with the GUI device 145 to identify a beverage order, collect payment, etc. In one example, a user presses a touchpad of GUI device 145 to select the size and type of beverage to be dispensed, and GUI device 145 communicates a signal 147 to master controller 111 indicative of the desired size and type of beverage to be dispensed.

In another further aspect, master controller 111 tracks the users of a beverage dispensing device and their beverage orders, and communicates the tracking data to beverage tracking server 101. In some embodiments, the beverage dispensing device 110 communicates messages 106 to the beverage tracking server system 101 indicative of a number of pours from a particular beverage cartridge, an identification of a user of the beverage dispensing device, a discrepancy between the cumulative amounts of beverage fluid estimated by the local and master controllers, etc.

Figure 2:
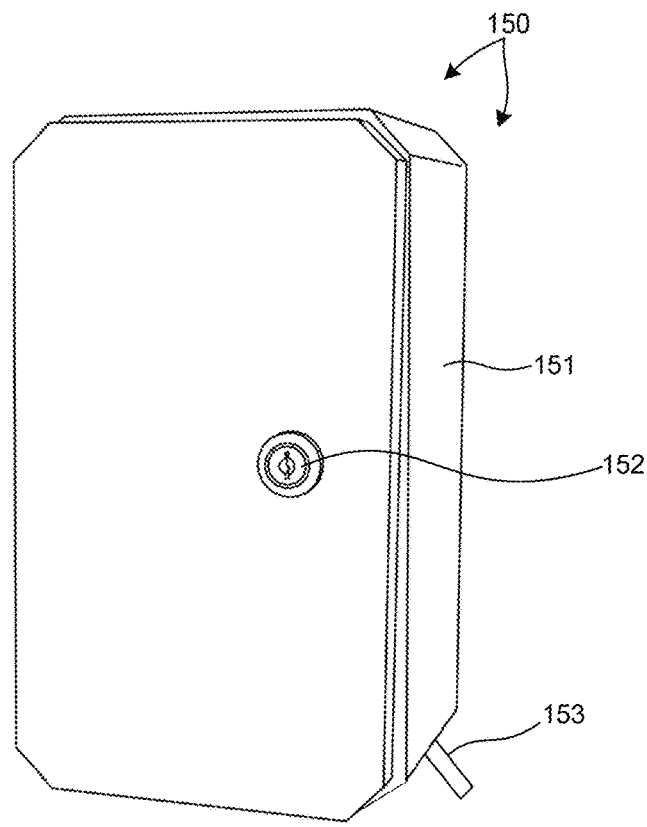
FIG. 2 is a diagram illustrative of beverage cartridge 150 in a closed, locked state.

FIG. 2 is a diagram illustrative of beverage cartridge 150 in a closed, locked state. As depicted in FIG. 2, the beverage cartridge 150 includes a housing 151, a locking device 152, and an output connector 153.

Figure 3:
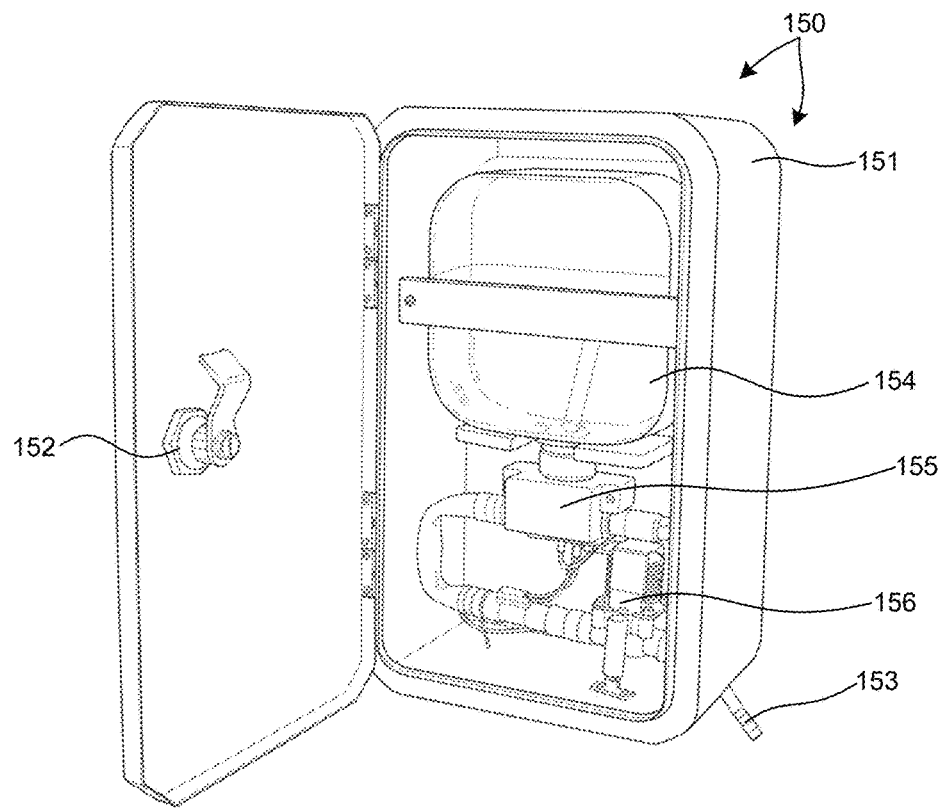
FIG. 3 is a diagram illustrative of a beverage cartridge 150 in an open, unlocked state.

FIG. 3 is a diagram illustrative of a beverage cartridge 150 in an open, unlocked state. As depicted in FIG. 3, the beverage cartridge 150 includes a housing 151, a locking device 152, an output connector 153, a reservoir 154, an output valve 155, and a flowmeter 156.

Figure 4:
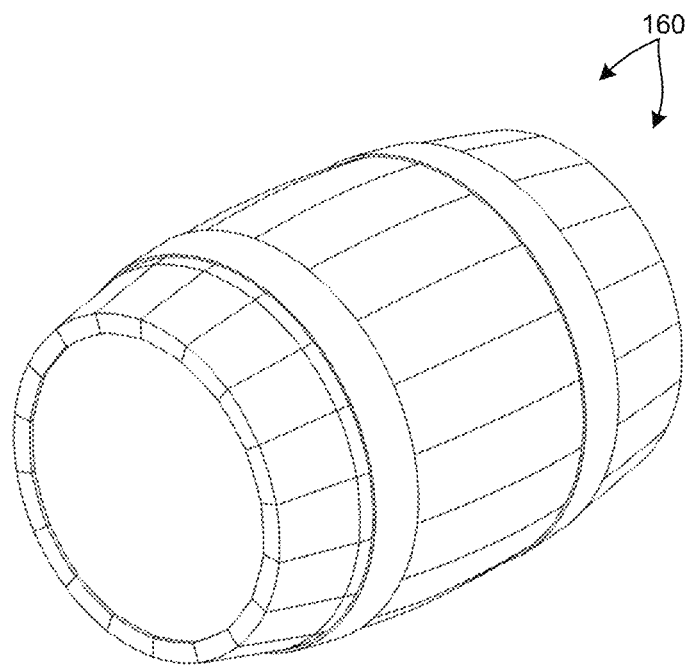
FIG. 4 is a diagram illustrative of beverage dispensing device 160 in a closed position in one embodiment.

FIG. 4 is a diagram illustrative of beverage dispensing device 160 in a closed position in one embodiment. As depicted in FIG. 4, beverage dispensing device 160 is shaped to resemble a barrel.

Figure 5:
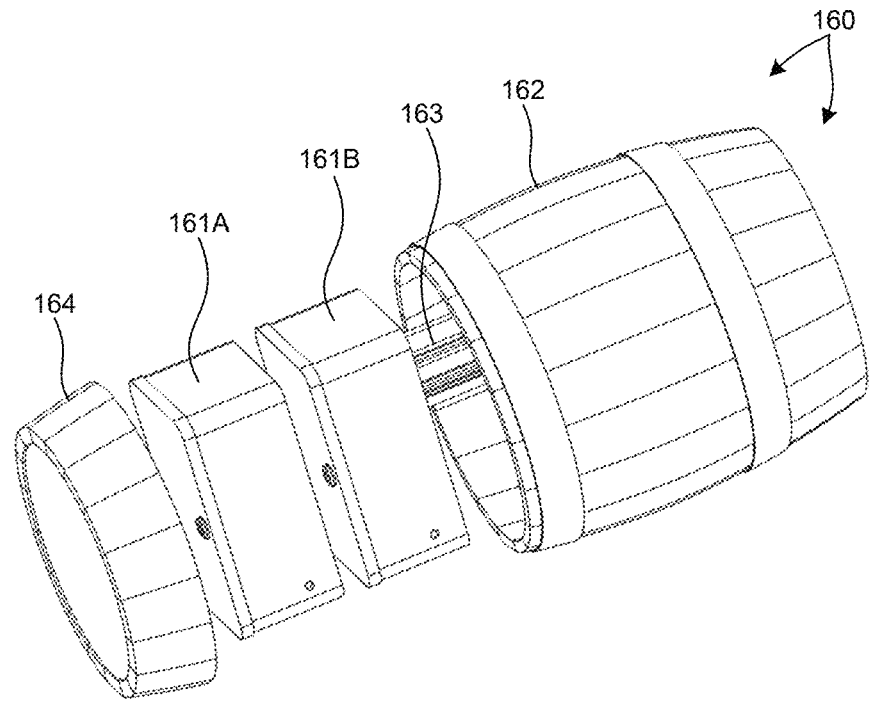
FIG. 5 is a diagram illustrative of beverage dispensing device 160 in an open position in one embodiment.

FIG. 5 is a diagram illustrative of beverage dispensing device 160 in an open position in one embodiment. As depicted in FIG. 5, beverage dispensing device 160 includes a housing 162, a track system 163, and an end cap 164. The track system 163 is coupled to housing 162 and end cap 164. The track system 163 allows the end cap 164 to separate from housing 162 along a linear path. As depicted in FIG. 5, cartridges 161A and 161B are coupled to a frame of end cap 164.

Figure 6:
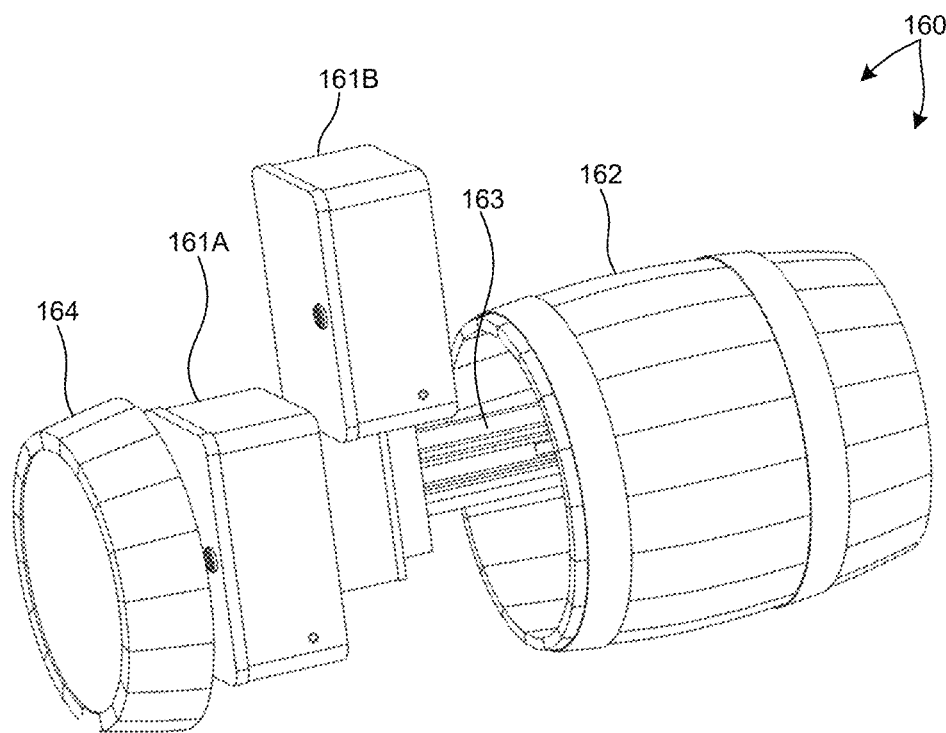
FIG. 6 is another diagram illustrative of beverage dispensing device 160 in an open position in one embodiment.

FIG. 6 is a diagram illustrative of beverage dispensing device 160 in an open position in one embodiment. As depicted in FIG. 6, beverage dispensing device 160 includes a housing 162, a track system 163, and an end cap 164. The track system 163 is coupled to housing 162 and end cap 164. The track system 163 allows the end cap 164 to separate from housing 162 along a linear path. As depicted in FIG. 6, cartridges 161A and 161B slide onto the frame of end cap 164.

Figure 7:
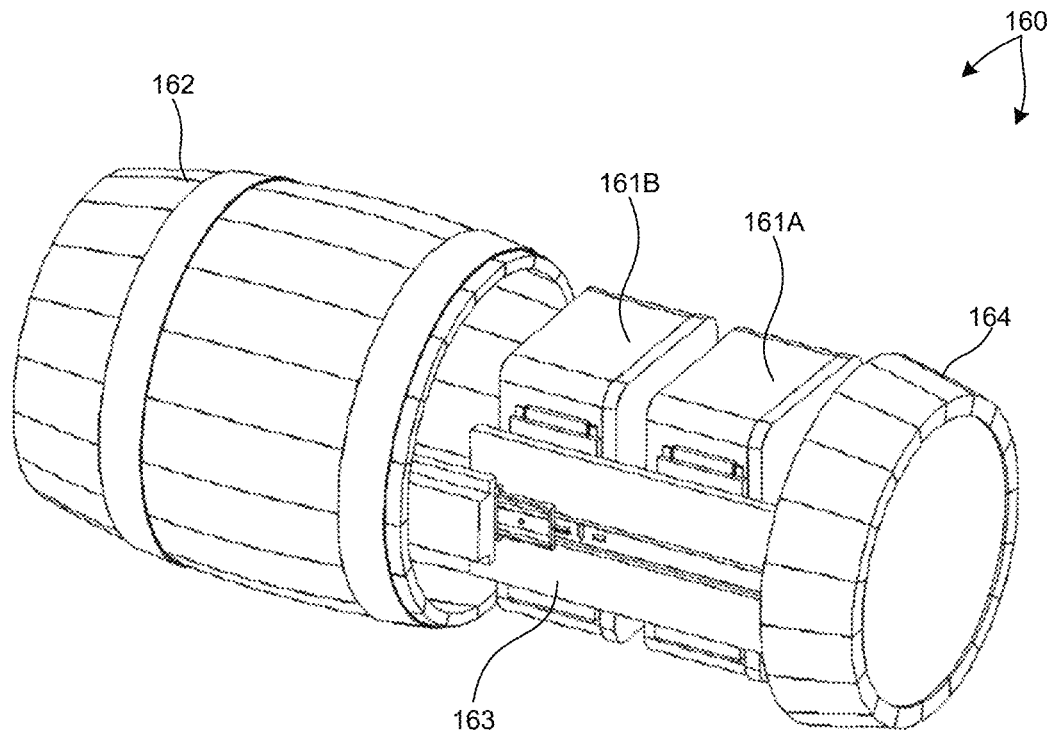
FIG. 7 is a diagram illustrative of a rear view of beverage dispensing device 160 in an open position in one embodiment.

FIG. 7 is a diagram illustrative of a rear view of beverage dispensing device 160 in an open position in one embodiment. As illustrated in FIG. 7, the housing 162 envelopes beverage cartridges 161A and 161B in the closed state.

Although FIGS. 2-7 depict a particular mechanical design of a beverage dispensing device and beverage cartridge, it is understood that many mechanical architectures may be contemplated within the scope of this patent document.

As depicted in FIG. 1, beverage tracking server 101 includes a processor 102 and an amount of memory 104. Processor 102 and memory 104 may communicate over bus 103. Memory 104 includes an amount of memory that stores a database program executable by processor 102. Exemplary, commercially available database programs include Oracle®, Microsoft SQL Server®, IBM DB2®, etc. Memory 104 also includes an amount of memory that stores a beverage dispensing database of beverage cartridges, dispense locations, authorized users, beverage pours, etc., searchable by the database program executed by processor 102.

By way of non-limiting example, beverage tracking server 101 is operable to communicate with an external computing system (not shown) over a communications link.

In one example, an external computing system requests a beverage dispense record 107 associated with a particular beverage dispensing device, and in response, beverage tracking server 101 communicates the beverage dispense record 107 to the external computing system.

Figure 8:
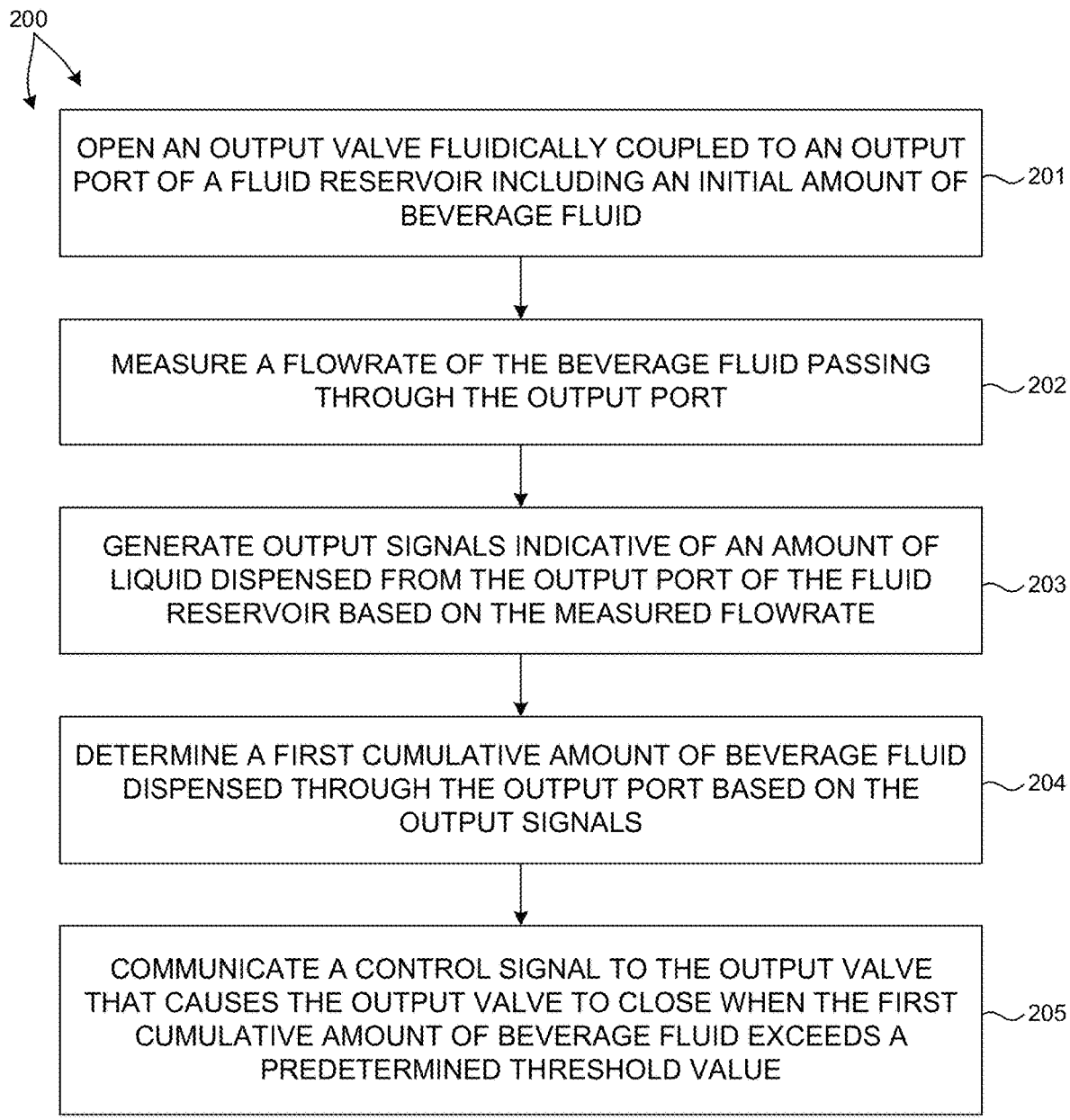
FIG. 8 is a flowchart illustrative of a method 200 of dispensing beverages in at least one aspect.

FIG. 8 illustrates a method 200 for dispensing beverages in at least one aspect. Method 200 is suitable for implementation by a beverage distribution system 100 illustrated in FIG. 2 of the present invention. In one aspect, it is recognized that data processing blocks of method 200 may be carried out via a pre-programmed algorithm executed by one or more processors of the beverage distribution system 100, or any other general purpose computing system. It is recognized herein that the particular structural aspects of beverage distribution system 100 do not represent limitations and should be interpreted as illustrative only.

In block 201, an output valve fluidically coupled to an output port of a fluid reservoir including an initial amount of beverage fluid is opened.

In block 202, a flowrate of the beverage fluid passing through the output port is measured.

In block 203, output signals indicative of an amount of liquid dispensed from the output port of the fluid reservoir are generated based on the measured flowrate.

In block 204, a first cumulative amount of beverage fluid dispensed through the output port is determined based on the output signals.

In block 205, a control signal is communicated to the output valve that causes the output valve to close when the first cumulative amount of beverage fluid exceeds a predetermined threshold value.

In one or more exemplary embodiments, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

Although certain specific embodiments are described above for instructional purposes, the teachings of this patent document have general applicability and are not limited to the specific embodiments described above. Accordingly, various modifications, adaptations, and combinations of various features of the described embodiments can be practiced without departing from the scope of the invention as set forth in the claims.

What is claimed is:

1. A beverage distribution system comprising:
one or more beverage cartridges, each of the one or more beverage cartridges comprising:
a fluid reservoir including an output port and an initial amount of beverage fluid within the fluid reservoir;
an output valve fluidically coupled to the output port, wherein the beverage fluid passes through the output valve after exiting the fluid reservoir through the output port;
a flow meter fluidically coupled to the output port, wherein the beverage fluid passes through the flowmeter after exiting the fluid reservoir through the output port, the flow meter configured to generate output signals indicative of an amount of liquid dispensed from the output port of the fluid reservoir;
a local controller communicatively coupled to the output valve and the flow meter, the local controller configured to:
receive the output signals from the flow meter;
determine a first cumulative amount of beverage fluid dispensed from the beverage cartridge based on the output signals;
communicate a control signal to the output valve that causes the output valve to close when the first cumulative amount of beverage fluid exceeds a predetermined threshold value;
a beverage dispensing device, the one or more beverage cartridges removably coupled to the beverage dispensing device, the beverage dispensing device comprising:
a master controller communicatively coupled to the local controller of each of the one or more beverage cartridges, the master controller configured to:
communicate a control command that causes a metered amount of fluid to be dispensed;
determine a second cumulative amount of beverage fluid dispensed from each of the one or more beverage cartridges based on the control command;
determine a difference between the first and second cumulative amounts of fluid dispensed from each of the one or more beverage cartridges; and
communicate an indication of a discrepancy between the first and second cumulative amounts of beverage fluid when the difference exceeds a predetermined threshold value.

2. The beverage distribution system of claim 1, each of the one or more beverage cartridges further comprising:
an amount of non-volatile memory, the local controller further configured to store an indication of the first cumulative amount of beverage fluid dispensed from the beverage cartridge onto the non-volatile memory.

3. The beverage distribution system of claim 1, the master controller further configured to:
communicate a control command to the local controller that causes the local controller to communicate a control signal to the output valve that causes the output valve to remain in an open state during a time the metered amount of fluid is dispensed.

4. The beverage distribution system of claim 3, wherein the local controller communicates the control signal to the output valve in response to the command signal only if the command signal matches a predetermined code stored on a memory of the local controller.

5. The beverage distribution system of claim 1, the beverage dispensing device further comprising:
a Radio Frequency Identification (RFID) reader electrically coupled to the master controller, the RFID reader configured to identify a user of the beverage distribution system, collect payment, or both.

6. The beverage distribution system of claim 1, the beverage dispensing device further comprising:
a graphical user interface (GUI) device electrically coupled to the master controller, the GUI device configured to interact with a user of the beverage dispensing device to identify a beverage order, collect payment, or both.

7. The beverage distribution system of claim 1, wherein the master controller is communicatively coupled to the local controller of each of the one or more beverage cartridges by a wired communications interface.

8. The beverage distribution system of claim 1, wherein the master controller is communicatively coupled to the local controller of each of the one or more beverage cartridges by a wireless communications interface.

9. The beverage distribution system of claim 1, wherein communications between the master controller and the local controller of each of the one or more beverage cartridges are encrypted.

10. The beverage distribution system of claim 1, further comprising:
a beverage tracking server system communicatively coupled to the beverage dispensing device, the beverage dispensing device configured to communicate messages to the beverage tracking server system indicative of any of a number of pours from a particular beverage cartridge, an identification of a user of the beverage dispensing device, and the discrepency between the first and second cumulative amounts of beverage fluid.

11. The beverage distribution system of claim 10, wherein the beverage tracking server system is communicatively coupled to the beverage dispensing device via the Internet.

12. The beverage distribution system of claim 1, the beverage dispensing device further comprising a mechanical housing having an open state and a closed state, wherein the mechanical housing envelopes each of the one or more beverage cartridges in the closed state.

13. A method comprising:
opening an output valve fluidically coupled to an output port of a fluid reservoir including an initial amount of beverage fluid;
measuring a flowrate of the beverage fluid passing through the output port;
generating output signals indicative of an amount of liquid dispensed from the output port of the fluid reservoir based on the measured flowrate;
determining a first cumulative amount of beverage fluid dispensed through the output port based on the output signals;

communicating a control signal to the output valve that causes the output valve to close when the first cumulative amount of beverage fluid exceeds a predetermined threshold value;

communicating a control command that causes a metered amount of fluid to be dispensed from the output port of the fluid reservoir;

determining a second cumulative amount of beverage fluid dispensed from the output port based on the control command;

determining a difference between the first and second cumulative amounts of beverage fluid dispensed from the output port; and communicating an indication of a discrepancy between the first and second cumulative amounts of beverage fluid when the difference exceeds a predetermined threshold value.

14. The method of claim 13, further comprising:
storing an indication of the first cumulative amount of beverage fluid dispensed from the output port onto a non-volatile memory.

15. The method of claim 13, further comprising:
communicating a control command to a local controller that causes the local controller to communicate a control signal to the output valve that causes the output valve to remain in an open state during a time the metered amount of fluid is dispensed.

16. The method of claim 15, wherein the local controller communicates the control signal to the output valve in response to the command signal only if the command signal matches a predetermined code stored on a memory of the local controller.

17. A beverage distribution system comprising:
one or more beverage cartridges, each of the one or more beverage cartridges comprising:
a fluid reservoir including an output port and an initial amount of beverage fluid within the fluid reservoir;
an output valve fluidically coupled to the output port, wherein the beverage fluid passes through the output valve after exiting the fluid reservoir through the output port;
a flow meter fluidically coupled to the output port, wherein the beverage fluid passes through the flowmeter after exiting the fluid reservoir through the output port, the flow meter configured to generate output signals indicative of an amount of liquid dispensed from the output port of the fluid reservoir;
a first non-transitory, computer readable medium comprising instructions that when executed by one or more processors, cause the one or more processors to:
receive the output signals from the flow meter;
determine a first cumulative amount of beverage fluid dispensed from the beverage cartridge based on the output signals;
communicate a control signal to the output valve that causes the output valve to close when the first cumulative amount of beverage fluid exceeds a predetermined threshold value;
a beverage dispensing device, the one or more beverage cartridges removably coupled to the beverage dispensing device, the beverage dispensing device comprising:
a second non-transitory, computer readable medium comprising instructions that when executed by one or more processors, cause the one or more processors to:
communicate a control command that causes a metered amount of fluid to be dispensed from the beverage dispensing device;
determine a second cumulative amount of beverage fluid dispensed from each of the one or more beverage cartridges based on the control command;
determine a difference between the first and second cumulative amounts of fluid dispensed from each of the one or more beverage cartridges; and
communicate an indication of a discrepancy between the first and second cumulative amounts of beverage fluid when the difference exceeds a predetermined threshold value.

18. The beverage distribution system of claim 17, the beverage dispensing device further comprising:
a Radio Frequency Identification (RFID) reader electrically coupled to the master controller, the RFID reader configured to identify a user of the beverage distribution system, collect payment, or both.

19. The beverage distribution system of claim 17, the beverage dispensing device further comprising:
a graphical user interface (GUI) device electrically coupled to the master controller, the GUI device configured to interact with a user of the beverage dispensing device to identify a beverage order, collect payment, or both.

* * * * *